May 26, 1970          F. SINGER          3,513,763

PHOTOGRAPHIC SHUTTER

Filed Nov. 6, 1967          4 Sheets-Sheet 1

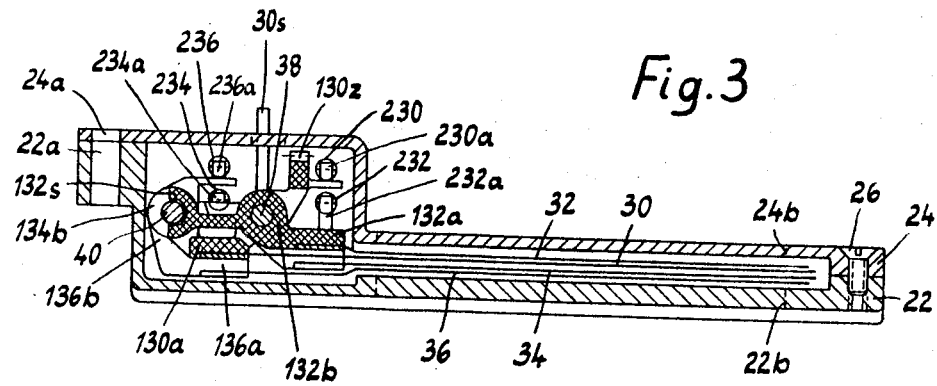
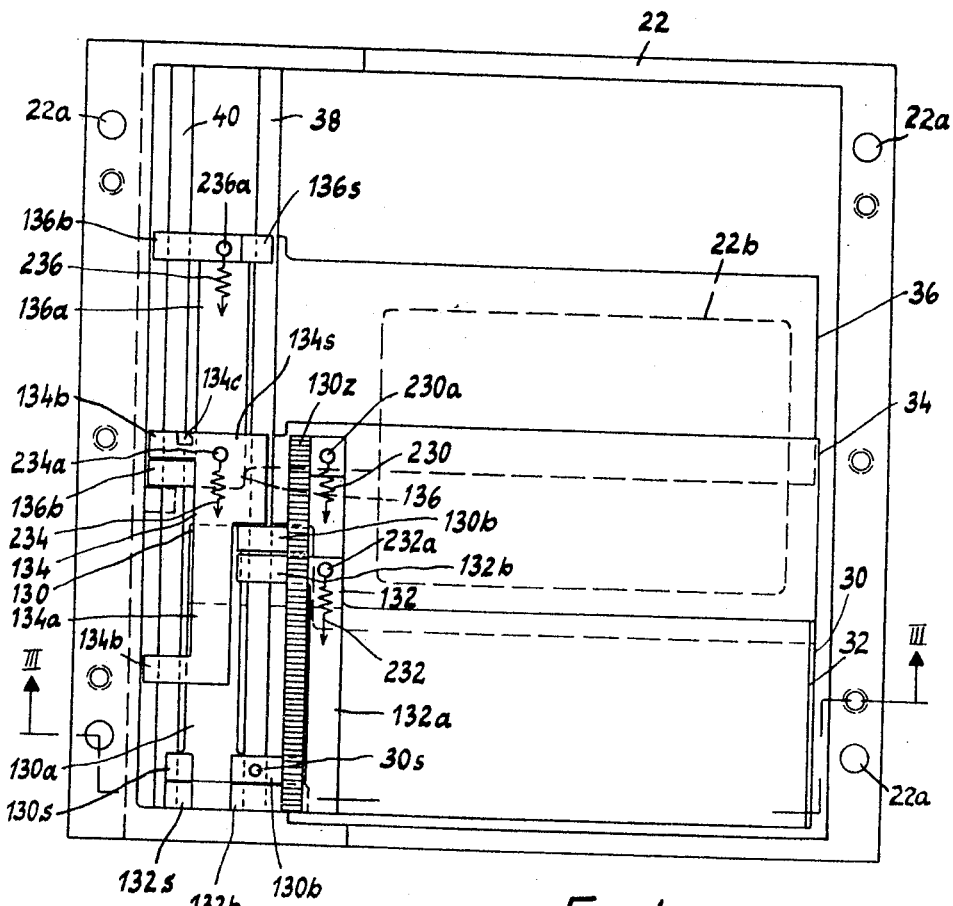

United States Patent Office 3,513,763
Patented May 26, 1970

3,513,763
PHOTOGRAPHIC SHUTTER
Franz Singer, Munich, Germany, assignor to Compur-Werk Gesellschaft mit beschrankter Haftung & Co., Munich, Germany, a German firm
Filed Nov. 6, 1967, Ser. No. 680,814
Claims priority, application Germany, Nov. 10, 1966,
C 40,652; Nov. 11, 1966, C 40,672
Int. Cl. G03b 9/36
U.S. Cl. 95—55   12 Claims

ABSTRACT OF THE DISCLOSURE

A photographic shutter of the focal plane type, has four thin slides or blades, preferably of metal, two of which participate in the opening movement and the other two participate in the closing movement. Two guide rods extend parallel to the focal plane on one side of the picture area. The two opening slides are mounted on the first guide rod, with parts engaging the second guide rod to hold the slides against rotation around the first guide rod. The two closing slides are mounted on the second guide rod, with parts engaging the first guide rod to prevent rotation of the slides. The slides are individually spring powered, the springs of the primary slides (the main opening slide and the main closing slide) being more powerful than the springs of the trailing or follow-up secondary slides.

BACKGROUND OF THE INVENTION

The present invention relates to focal plane shutters, as distinguished from objective shutters or between-the-lens shutters. Focal plane shutters are located just in front of, and as near as possible to, the focal plane or film plane of the camera. The shutter normally blocks off passage of light to the focal plane. When a photographic exposure is to be made, the shutter parts are moved to provide an opening through which light may reach the sensitized film in the focal plane. One edge of the opaque or light obstructing material is withdrawn across the exposure area or picture area, to create an opening through which light may pass to the film, and this edge may be called the opening edge. Another edge of opaque material, which may be called the closing edge, follows the opening edge across the picture area, and terminates the exposure. The exposure time, or length of exposure, is determined by the time interval between the instant that the opening edge passes a given point of the exposure area, and the time that the closing edge passes the same point.

In one well known type of focal plane shutter, the opening edge and the closing edge are formed on flexible material which travels across the exposure area, being unwound from a roller at one side of the exposure area and wound up onto a roller on the opposite side of the exposure area. Such focal plane shutters are sometimes called roller blind shutters or curtain shutters. In another type of focal plane shutter, the opening edge and closing edge are formed on blades which move across the exposure area. It is to this second type of focal plane shutter, using blades rather than a flexible curtain, that the present invention relates.

Although it is possible to use a single blade for opening and another single blade for closing the exposure area, a more compact construction is possible if one uses a plurality of blades (which may be called the opening group of blades) for performing the opening movement, and a separate plurality of blades (which may be called the closing group of blades) for closing the exposure aperture at the termination of the exposure. The problem is to mount the blades in a manner such that they can be moved easily and quickly, with relatively low friction, and to hold them against swinging movements which might cause undesired interference of one blade with another, resulting in increased friction and possibly in damage of the blades. When more than one blade is used for opening and more than one blade is used for closing, the problem also involves the driving of the blades in such a way that the main or primary opening blade is not impeded in its opening movements by the inertia of the secondary or follow-up opening blade or blades, and the closing movements of the main closing blade is similarly not impeded by the inertia of the secondary or follow-up closing blade or blades. U.S. Pats. 2,921,510 and 2,950,665 are examples of prior art constructions in which the above mentioned problems still exist.

The first of these problems has been overcome, according to the present invention, by providing two guide rods parallel to each other and slightly spaced laterally from each other, at one side of the exposure aperture or picture area. The blades of the opening group are mounted on carriers which slide primarily along one of these rods, but with parts of the carriers engaging the second rod in such a way as to prevent the carrier from turning or swinging on the first rod. The blades of the closing group are mounted on their own carriers which slide primarily on the second rod, but which have portions engaging the first rod in such fashion as to prevent the carriers from swinging or turning on the second rod. The second of the above mentioned problems, relating to the impeding of the movements of the primary opening and closing blades by the inertia of the secondary or follow-up blades, has been overcome according to the present invention by providing each of the blades with its own individual spring power means, so that the supplementary or follow-up opening blade does not have to be moved by the primary opening blade but is moved by its own power spring, and the supplementary or follow-up closing blade does not have to be moved by the primary closing blade but is moved by its own power spring.

BRIEF DESCRIPTION OF THE DRAWINGS

In the accompanying drawings, which form a material part of the present disclosure and are incorporated herein by reference, and which illustrate a preferred embodiment of the invention:

FIG. 3 is an enlarged horizontal section through the shutter unit of the camera, taken approximately on the lin III—III of FIG. 4;

FIG. 4 is a front elevation of the shutter unit removed from the camera and with the front cover plate removed from the unit, showing the blades in the rest or run-down position assumed at the completion of an exposure;

DESCRIPTION OF THE PREFERRED EMBODIMENT

Figure 1:
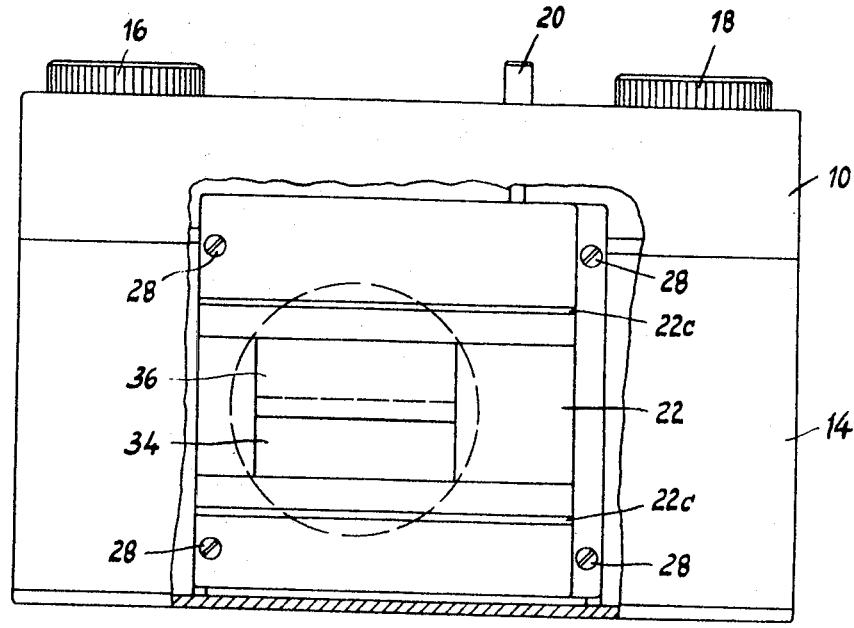
FIG. 1 is a rear view of a photographic camera equipped with a shutter according to a preferred form of the present invention, with the rear of the camera partly broken away to show the interior construction.
Figure 2:
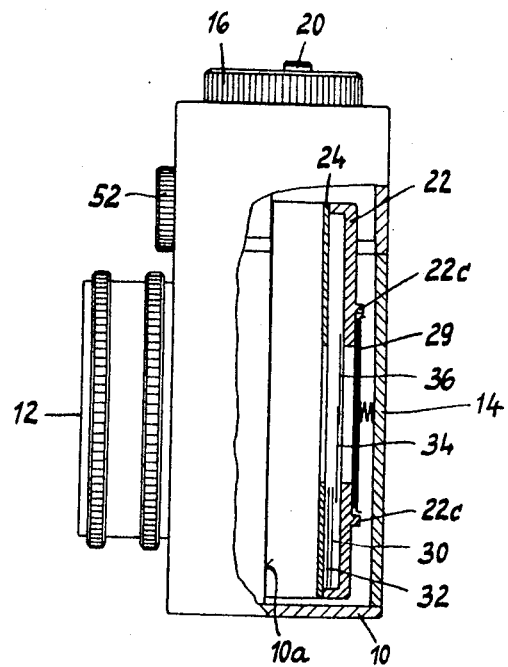
FIG. 2 is a side view of the camera, again partly broken away.

The shutter of the present invention is mounted in a camera which, except for the shutter, may be of conventional known construction. Referring first to FIGS. 1 and 2, the housing or casing of the camera is shown in general at 10, and it has the usual lens or objective within the lens housing 12 which is mounted on and projects from the front wall of the camera. A movable rear cover 14 closes the rear of the camera and, when moved to an open position, permits access to the interior of the camera for loading and unloading the film, which is advanced or fed in the conventional way by turning the film feeding knob 16, and which is rewound onto the supply spool in the usual conventional cassette by turning the film rewinding knob 18. The exposure is initiated by depressing the shutter trip or trigger plunger 20.

The focal plane shutter of the present invention is preferably constructed as an independent unit or assembly which is then placed in the camera body after the construction of the unit is completed. FIGS. 1 and 2 show the shutter unit within the camera body, while the other views show various parts of the shutter unit itself, without the camera body.

Figure 6:
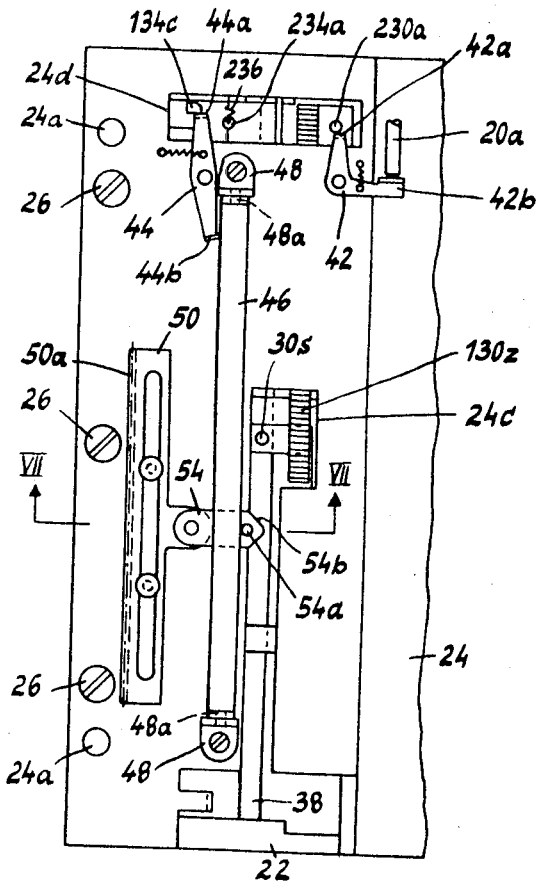
FIG. 6 is a front elevation of the left hand portion of the shutter unit illustrating certain details of the mechanism for controlling the exposure period or speed.
Figure 8:
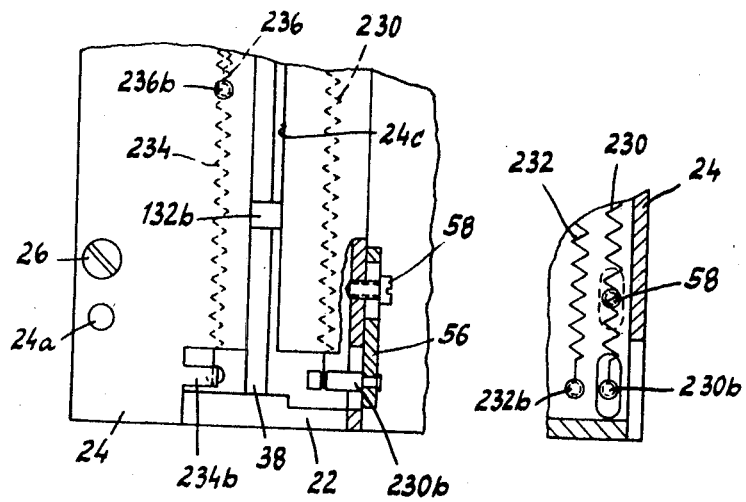
FIG. 8 is a fragmentary front elevation of the lower left corner of the shutter unit, with parts broken away and parts in section, illustrating the means for fastening and adjusting the driving springs of the shutter.

The shutter unit comprises a housing having two approximately rectangular portions of similar outline, a rear portion 22 and a front portion 24 connected to each other by a few screws 26 (FIGS. 3, 6, and 8). The portions are so shaped as to leave a hollow space between the main front and back wall portions of the shutter housing, while the portions make contact with each other around their margins. Alined openings 22a and 24a (FIG. 3) are provided in the shutter housing parts 22 and 24, respectively, for the passage of fastening screws 28 (FIG. 1) which fasten the shutter housing to an interior wall 10a (FIG. 2) or other suitable part of the camera housing.

The back wall 22 and the front wall 24 of the shutter housing have openings or picture windows 22b and 24b, respectively, which are alined with each other and which define the exposure aperture or area through which light may pass rearwardly to impinge upon the sensitized photographic film 29, which is guided for movement in the focal plane between two guide rails or ribs 22c (FIGS. 1 and 2) projecting from and extending horizontally across the rear face of the rear wall 22 of the shutter housing. A presser plate is spring pressed forwardly against the rear face of the film, to hold the front face of the film snugly against the rear face of the wall 22.

The shutter blades comprise four approximately rectangular blades or slides 30, 32, 34, and 36 made of opaque thin sheet material, preferably sheet steel. At one end (the left end when viewed as in FIGS. 4 and 5) each slide or blade is secured, as for example by screws, to its own individual guide element or carrier 130, 132, 134, and 136, respectively. Two guide bars or rods 38 and 40 are mounted in the shutter casing, extending vertically and parallel to and spaced laterally from each other, a little to the left of the exposure aperture windows 22b and 24b, and the above mentioned carriers or guide elements 130–136 for the blades or slides 30–36 are mounted to slide on these guide bars or rods 38, 40 in the manner further described below.

The shutter blades 30 and 32 collectively constitute the opening group of blades, of which the blade 30 is the main opening blade and the blade 32 is the trailing or supplementary opening blade. The blades 34 and 36 collectively constitute the closing group of blades, of which the blade 34 is the main closing blade and 36 is the trailing or supplementary closing blade.

The carrier or guide element 130 for the blade 30 has a main web portion 130a to which the blade 30 is attached, and top and bottom laterally extending projections or flanges 130b having guide holes or bores snugly but slidably embracing the guide rod 38. There is also a lateral flange 130s recessed or slotted vertically so as to extend part way (preferably about half way) around but not all the way around the other guide rod 40. Thus the carrier 130 for the blade 30 is guided mainly on the guide rod 38 and can slide up and down this guide rod, but engages part way around the other guide rod 40 sufficiently to prevent the carrier 130, 130a from swinging around its main guide rod 38. This arrangement keeps the shutter blade 30 in a definite plane, preventing any swinging out of that plane.

Figure 5:
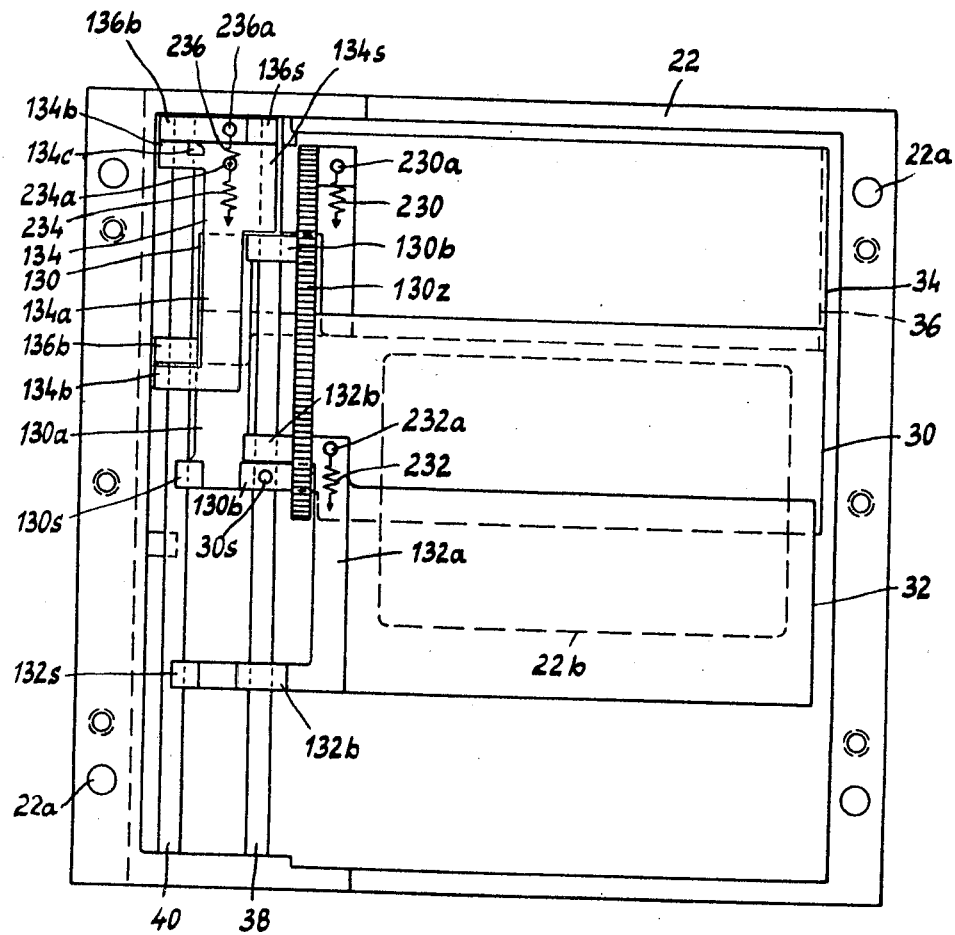
FIG. 5 is a view similar to FIG. 4, showing the blades in the tensioned or initial starting position ready for making an exposure.

Similarly, the carrier 132 for the trailing or supplementary opening blade 32 has a web 132a to which the blade is attached, and top and bottom lateral flanges 132b apertured to receive and slide on the guide rod 38, and a lateral extension 132s vertically slotted to engage about half way around the other guide rod 40 sufficiently to prevent the carrier 132 from swinging in either direction on the rod 38. This construction is well illustrated in FIG. 3. It will be noted from comparing FIGS. 4 and 5 that the upper flange 132b of the carrier 132 is located between the upper and lower flanges 130b of the carrier 130, and the lower flange 132b is located below the lower flange 130. When the shutter is in the rest or run-down position, the upper and lower flanges 130b rest respectively upon the upper and lower flanges 132b, but when the shutter is in cocked or tensioned position as seen in FIG. 5, the upper flange 132b rests upon the lower flange 130b.

The blades 34 and 36 of the closing group are mounted in a generally similar manner, but for these blades the guide rod 40 is the main guide, and their carriers engage about half way around the rod 38, to the extent necessary to prevent the carriers from swinging around the rod 40. Thus the carrier 134 has a main web 134a to which the shutter blade or slide 34 is secured, and top and bottom lateral flanges 134b which are apertured to surround and slide on the guide rod 40, and a lateral extension or flange 134s vertically slotted to extend about half way around the guide rod 38 to prevent the carrier 134 from swinging on its rod 40. Likewise the carrier 136 for the blade 36 has a main web 136a to which the blade is attached, and top and bottom flanges 136b apertured to surround and slide on the rod 40, and a flange 136s vertically slotted to extend about half way around the rod 38 to prevent any swinging of this carrier about the rod 40 on which it is mounted. The lower flange 136b of the carrier 136 surrounds the rod 40 between and the upper and lower flanges 134b of the carrier 134.

The respective carriers for the respective shutter blades are of such size and shape as to provide for sequential engagement of the carriers with each other during the operation of the shutter, as will be apparent from the drawings and as further described to some extent below. It may be noted that only a short length of guide surface is required for the guide rods 38 and 40, thus increasing the guiding accuracy of the arrangement, and enabling the overall height of the construction to be reduced to a very compact size. In addition, this arrangement of guidance and control to prevent turning of the parts on their respective guide rods facilitates the movement of the slides or blades relative to one another and to the shutter housing, in accurate positions where the blades do not rub against or interfere with each other or the housing, under very low frictional conditions. To decrease the sliding friction, the rods 38 and 40 are preferably of metal while the carriers 130, 132, 134, and 136 are preferably molded from low friction plastic material, such as "Delrin" or "Teflon," both of which are well known per se, and the plastic material may preferably be impregnated or coated with a friction-reducing compound such as molybdenum disulphide.

Figure 9:
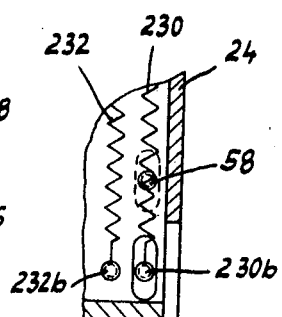
FIG. 9 is a section through part of the structure shown in FIG. 8, the section being taken at right angles to the plane of FIG. 8.

Each shutter blade has its own individual driving spring associated with it, anchored at one end to the corresponding carrier 130–136 and at the other end to the housing. The driving spring of the main opening blade 30 is indicated at 230, and is a coil tension spring anchored at its upper end to the guide element 130 at 230a (FIGS. 3 and 4) and the lower end of the spring is anchored in the housing 24 at 230b (FIGS. 8 and 9). The other springs and their respective anchorages have been given similar reference numerals, namely, anchorages 232a and 232b for the spring 232 of the blade 32; anchorages 234a and 234b for the driving spring 234 of the blade 34; and anchorages 236a and 236b for the driving spring 236 of the blade 36.

The springs 230 and 234 for the main opening slide 30 and main closing slide 34, respectively, are of the same length and same tractive power. The driving springs 232 and 236 for the trailing opening slide 32 and trailing closing slide 36, respectively, are likewise of the same length and tractive power, but preferably somewhat weaker than the springs 230 and 234 of the main slides 30 and 34. Also, it is preferable that the spring anchorage points on the housing 24 are adjustable for setting purposes, in order to adjust the strength of each spring to exactly the desired force. Such an adjustment for the spring 230 is shown in FIGS. 8 and 9, where it is seen that the lower or housing anchorage 230b of the spring 230 is not directly on a fixed wall of the shutter housing part 24, but is on a movable setting plate 56 which slides in the direction of the length of the spring 230 on a fixed wall of the shutter housing 24, and is held in adjusted position by tightening a set screw 58. Similar adjustable mountings are preferably provided for the other springs 232, 234, and 236, although it is thought unnecessary to illustrate them in detail.

In FIGS. 4 and 5, only the upper part of each spring is shown, to simplify the illustration, and arrowheads are used to indicate the downward direction of pull of each spring. To load the driving springs and tension or cock the shutter parts ready for making an exposure, the shutter blades or slides and their carriers must be moved upwardly in a direction opposite to that of the arrows, from the rest or run-down position of FIG. 4 to the loaded or cocked or tensioned position shown in FIG. 5.

For producing the upward tensioning movement, the carrier 130 of the blade 30 is provided with a toothed rack 130z extending vertically on the carrier, parallel to the guide rods 38 and 40. This rack 130z meshes with a conventional toothed pinion (not shown) which is mounted on the shutter housing and which extends through a slot 24c (FIG. 6) of the housing to mesh with the rack. The pinion is coupled in conventional manner to the film advance knob 16 or other film is equipment of the camera, in any suitable way not here illustrated, so that when the film is advanced to bring a fresh portion of the film into the picture area of the camera, the pinion will be turned in a direction to drive the rack 130z upwardly. This will raise the guide element or carrier 130 upwardly, carrying with it the main opening blade 30 from the final rest or run-down position shown in FIG. 4, to the tensioned position shown in FIG. 5.

It may be noted at this point that in the run-down position of FIG. 4, both blades 30 and 32 of the opening group are approximately alined with each other, one behind the other, and both of them are entirely below the exposure openings 22b and 24b, while the passage of light through the exposure openings is prevented by the blades 34 and 36 of the closing group, the blade 34 covering approximately the lower half of the exposure opening and the blade 36 covering approximately the upper half thereof, with adequate overlap of these two blades as illustrated. In the tensioned or cocked position of FIG. 5, the reverse situation occurs, both blades 34 and 36 of the closing group being above the top edge of the exposure opening, and the passage of light through the exposure opening at this time is obstructed by the blades 30 and 32 of the opening group, the blade 30 covering approximately the upper half of the exposure opening while the blade 32 covers approximately the lower half of the exposure opening, with adequate overlap of these two blades.

Immediately at the commencement of the tensioning movement, when rotation of the pinion acting on the rack 130z begins to move the carrier 130 upwardly, the upper flange 130b of this carrier engages an overlying step shoulder or abutment portion of the carrier 134 of the blade 34, and raises the carrier 134 with its blade 34 simultaneously with the upward movement of the blade 30, but with the lower edge of the blade 34 remaining in overlapping relation to the upper edge of the blade 30, as illustrated, so that no light can pass.

After a predetermined extent of upward travel of the carriers 130 and 134 and their respective blades 30 and 34, but before the lower edge of the blade 30 uncovers the exposure area, the lower flange 130b of the carrier 130 engages the upper flange 132b of the carrier 132, and at substantially the same instant, the upper flange 134b of the carrier 134 engages the upper flange 136b of the carrier 136. Thus the carriers 132 and 136 are raised upwardly during approximately the last half of the upward movement of the carrier 130, whereby the blade 32 trails along behind the blade 30 with the upper edge of the blade 32 overlapping the lower edge of the blade 30 and covering the lower part of the exposure area, and whereby the blade 36 is raised, like the blade 34, to a position entirely above the exposure area. Thus all four of the shutter blades reach their tensioned or cocked positions without any uncovering of the exposure area or any passage of light through the exposure area.

The blades and their respective carriers are held in tensioned position as follows: A latching lever 42 (FIG. 6) preferably of bellcrank shape, is pivoted on the outer face of the wall 24 of the shutter housing. One end of the lever 42 is bent over to form a lug 42a which extend rearwardly through an opening 24d in the wall 24, to a position underlying the previously mentioned pin 230a on the carrier 130. The other arm of the bellcrank lever 42 engages beneath a pin 20a which constitutes the lower end of or is otherwise suitably connected to the trigger or release plunger 20. The latching lever 42 is spring biased to a position where the lug 42a underlies the pin 230a, as shown in FIG. 6, and snaps into this position when the carrier 130 reaches its upward limit of travel during the tensioning operation. But downward pressure on the release plunger or trigger 20 turns the latch lever 42 against the power of its biasing spring, releasing it from the pin 230a so that the spring 230 can move the carrier 130 and blade 30 downwardly to initiate an exposure.

Figure 7:
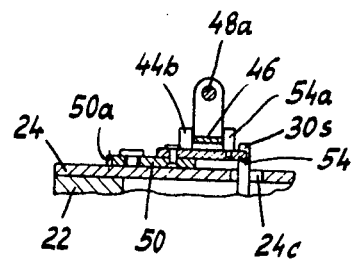
FIG. 7 is a fragmentary section taken approximately on the line VII—VII of FIG. 6.

So long as the carrier 130 and main opening blade 30 are held in tensioned position by the latching lever 42, the main closing blade 34 and its carrier 134 are necessarily also held in their uppermost positions by a second latch provided for independently holding the carrier 134 in tensioned position after the carrier 130 starts to move downwardly to make an exposure. This second latch for independently holding the carrier 134 in tensioned position comprises the latch lever 44 (FIG. 6) which, like the latch lever 42, is pivoted on the outside of the shutter casing wall 24 and has its upper end bent over to form a lug 44a which projects rearwardly into the interior of the shutter casing through the opening 24d, in position to underlie the pin 134c which projects from the carrier 134. The lever 44 is spring biased to latching position. The lower end of the lever 44 is bent over at 44b to engage against the left side of the vertically extending main portion of a transmission lever 46 (FIGS. 6 and 7) the top and bottom ends of which are bent over to form ears pivoted on a vertical pin 48a held by top and bottom brackets 48 fastened to the wall 24 of the shutter casing. The pin 48a which constitutes the pivotal axis of the lever 46 is parallel to the guide rods 38 and 40. The lever 46 with its main vertical section and its horizontal top and bottom ears is, in effect, a U-shaped member.

Also disposed parallel to the guide rods 38 and 40 and to the main vertical portion 46 of the transmission lever, is a slide member 50 (FIGS. 6 and 7) mounted for vertical sliding movement on the front face of the shutter housing wall 24. The slide 50 has rack teeth 50a along one edge, which mesh with a gear (not shown) operatively connected to and turned by a shutter time or speed setting knob 52 (FIG. 2) on the front wall of the camera body. By turning the knob 52, the slide 50 is adjusted vertically to any desired position within its range. By means of an index mark and a scale on the knob and the adjacent camera wall, the slide 50 can be set to various positions corresponding to various exposure time intervals or shutter speeds.

Pivoted to the slide 50 is a rocking lever 54 which extends behind the transmission member 46 and has a pin 54a projecting forwardly past the far edge (the right hand edge when seen as in FIG. 6) of the member 46 in contact therewith. The end of the lever 54 is pointed as shown at 54b, providing inclined cam surfaces for cooperation with a forwardly projecting pin 30s mounted on the carrier 130 and projecting out through a vertical portion of the slot 24c in the wall 24 of the shutter housing. The biasing spring of the lever 44 presses the tail 44b of this lever against the left side of the transmission member 46, tending to swing the member 46 to the right on its pivot rod 48a, and this causes rightward pressure against the pin 54a of the lever 54, tending to straighten the lever 54 out to the horizontal position shown in FIG. 6. As the carrier 130 moves upwardly during the tensioning of the shutter, the pin 30s engages the end 54b of the lever 54 and cams it upwardly on its pivot, thereby swinging the pin 54a leftwardly on an arc, pressing it against the right side of the transmission member 46 and swinging the vertical part of the transmission member leftwardly, which presses the tail 44b of the latching lever 44 leftwardly and swings the latching lever against the force of its biasing spring. As soon as the pin 30s passes on beyond the lever 54, the parts 44, 46, and 54 resume their normal positions illustrated in FIG. 6.

During the downward motion of the carrier 130, when making an exposure, a similar action occurs. The pin 30s, during its downward travel, engages the end 54b of the lever 54 and again cams it aside, downwardly rather than upwardly, so that the pin 54a travels in an arc which presses leftwardly against the right edge of the transmission member 46, again swinging the transmission member leftwardly on its pivot pin 48a to press leftwardly against the tail 44b of the latching lever 44, thereby moving the upper end 44a of the latching lever out from under the pin 134c and allowing the carrier 134 to start its downward movement to terminate the exposure.

It will be observed that this release of the latch 44, to permit the blade carrier 134 to start its downward movement, occurs at a variable point in the downward movement of the carrier 130, depending on the position of vertical adjustment of the shutter timing slide 50. When the slide 50 is adjusted to a higher position (by turning the adjusting knob 52) the pin 30s on the carrier 130 will engage the lever 54 and thus release the latching lever 44 earlier in the downward movement of the opening blade carrier 130, thus allowing the closing blade carrier 134 to start its downward movement earlier, producing a shorter exposure. When the timing slide 50 is adjusted to a lower position, the contact between the pin 30s and the end 54b of the lever 54 will occur at a later point in the downward travel of the opening blade carrier 130, so that the release of the latch 44 will occur later, and thus the exposure will be longer.

The tensioning or cocking motion of the shutter parts has been sufficiently described above. The operation of the shutter when making an exposure will now be described.

Assuming that the shutter parts are in the tensioned or cocked position illustrated in FIGS. 5 and 6, the exposure is initiated by depressing the trigger plunger 20 (FIG. 1) so that the pin 20a thereof (FIG. 6) swings the bellcrank latching lever 42 to release the pin 230a of the shutter blade carrier 130 which carries the main opening blade 30. The main opening blade carrier 130 immediately begins to move downward under the influence of its own spring 230, and the trailing blade carrier 132 also begins to move downwardly under the influence of its own independent spring 232, since the carrier 132 is held in its upper position only by the fact that the upper flange 132b of the carrier 132 overlies the lower flange 130b of the carrier 130 and thus the carrier 132 is free to move downwardly as soon as the carrier 130 begins to move downwardly.

Very shortly after the beginning of the downward movement of the carrier 130 and its blade 30, the top edge of the blade 30 begins to uncover the upper portion of the exposure area window 22b, 24b, and the exposure begins. Meanwhile, the closing blade carrier 134 remains latched in its upper position by the latch lever 44 engaging the pin or projection 134c. As the downward motion of the carrier 130 progresses, a point is reached where the pin 30s thereon (FIGS. 5 and 6) reaches the lever 54 (FIGS. 6 and 7) and swings this lever downwardly so that the pin 54a thereon swings on an arc which displaces the transmission member 46 leftwardly, thrusting the lower end 44b of the latching lever 44 leftwardly against the force of its biasing spring, and releasing the upper end 44a from under the pin 134c, so that the main closing blade carrier 134 can now start its downward movement under the influence of its independent spring 234. The main closing blade 34 thus descends, following the main opening blade 30 at the same speed, since the respective blades and their respective carriers are designed to have substantially the same mass and inertia, and their respective springs 230 and 234 are of the same power or force. The supplementary or trailing closing blade 36 and its carrier 136 also move downwardly under the influence of their own independent spring 236, since it is only the contact between the carriers 134 and 136 which holds the carrier 136 in its upper position, and it is free to move downwardly as soon as the carrier 134 moves downwardly.

It will be apparent that an exposure slot is formed between the upper edge of the main opening blade 30 and the lower edge of the main closing blade 34, both of these blades moving downwardly at the same speed, but with a gap between them. It will also be apparent that the width of this slot or gap is variable, in accordance with the setting of the control member 50 by the shutter speed adjusting knob 52. The higher the adjusted position of the member 50, the earlier (in the downward movement of the opening blade 30) will be the release of the closing blade, so that the exposure slots will be relatively narrow, and the lower the adjusted position of the member 50, the later will be the release of the closing blade 34, so that the exposure slot will be wider and a longer exposure time or slower shutter speed will result.

At the completion of the exposure, when the various parts reach their final rest positions, the main opening blade 30 and the supplementary or trailing opening blade 32 will both be below the exposure area, the main closing blade 34 will obstruct passage of light to the lower part of the exposure area, and the trailing closing blade 36, somewhat overlapping the blade 34, will obstruct passage of light to the upper part of the exposure area, being stopped in this position and being held against further downward travel by a suitable fixed stop. This position of the parts is illustrated in FIG. 4. Then when the film is advanced for taking the next picture, the tensioning pinion operates on the rack 130z to raise the carrier 130 and lift all of the carriers and blades to the tensioned or cocked position as already described.

It should be noted that this arrangement of separate springs for moving each of the blades avoids the momentary slowing down of the blades which occurs in some of the prior art shutters, where the trailing blades do not have springs of their own and where the main blade assembly (blade plus carrier) of the opening group has to make impact upon the trailing blade assembly of the opening group, to move the trailing assembly in its opening movement, and where the main closing blade assembly has to make impact with the trailing closing blade assembly to move the latter through its part of the closing movement. Such impact not only makes undesirable vibration and wear, but also slows up the desired quick movements of the main blade assemblies, which must slow down at the time of impact and then re-accelerate. With the arrangement of the present invention, there is a continuous pattern of smooth movement, both in opening and in closing, and consequently a very favorable shutter operation.

The springs in the present construction are so designed that the trailing assemblies will, under the power of their own respective springs, reach their final or rest position at substantially the same instant that the main assemblies reach their respective final or rest positions, and the springs of the trailing assemblies can be somewhat weaker than those of the main assemblies because the travel of the trailing assemblies is, in each case, somewhat shorter than that of the main assemblies. Also, all of the springs can be less powerful than in a construction where the same spring must serve for both a main blade and a trailing blade, so the springs can be flatter (i.e., of smaller diameter), resulting in a thinner shutter unit and in less vibration and rebound at the end of the blade movement.

The above described arrangement of the guide elements enables the tensioning means 130z and exposure time control means 30s to be disposed on the main opening blade assembly without impairment of the guiding precision. Also, with the guiding arrangement of the present invention, a comparatively light blade carrier, of low mass and inertia, is possible. Each blade carrier has only two small flanges, vertically spaced from each other, encircling its main guiding rod (38 or 40) to provide the main guidance and prevent vertical swinging or tilting, and only one small flange partially embracing the other guiding rod (40 or 38) to prevent horizontal swinging and to maintain the blade truly in its intended vertical plane without interference with other blades in closely adjacent vertical planes.

It will also be noted from FIG. 4 of the drawings that each individual driving spring lies on the same side of its associated guide rod as the blade. Thus, for example, the blade 32 is mounted on the guide rod 38, and the spring 232 of this blade is to the right (when viewed as in FIG. 4) of the rod 38 and the blade 32 itself is also to the right of the rod 38, so that both the blade and its spring lie on the same side (that is, the right hand side) of the guide rod 38 for this blade. The same is true of the spring 230 for the blade 30. Likewise, the blades 34 and 36 of the closing group are mounted on the rod 40, and the respective springs 234 and 236 for these blades are to the right of the rod 40, on the same side of the rod as the blades themselves. This arrangement brings the line of force of each spring closer to the center of gravity of the blade assembly than would be the case if the respective springs were in front of the respective guide rods instead of being offset from the guide rods in the same direction as the blades. Having the line of force of each spring closer to the center of gravity of its blade assembly, has the advantage of reducing the tendency of the blade assembly to cock or twist in a vertical direction relative to its guide rod.

It is to be understood that the disclosure is given by way of illustrative example only, rather than by way of limitation, and that without departing from the invention, the details may be varied.

What is claimed is:

1. A photographic shutter of the focal plane type comprising means forming an exposure aperture, a plurality of shutter blades constituting an opening group of blades movable relative to said aperture to admit light therethrough during a photographic exposure, another plurality of shutter blades constituting a closing group of blades movable relative to said aperture to stop passage of light therethrough to terminate an exposure, and first and second guide bars arranged parallel to each other, characterized by the fact that all the blades of said opening group are guided for movement along said first guide bar and are held against twisting relative to said first guide bar by said second guide bar, and that all the blades of said closing group are guided for movement along said second guide bar and are held against twisting relative to said second guide bar by said first guide bar.

2. A construction as defined in claim 1, wherein each of said blades is rigidly connected to an individual carrier, and each carrier has a portion substantially completely encircling one guide bar and a laterally open slot only partially encircling the other guide bar.

3. A construction as defined in claim 2, wherein each of said carriers is made of synthetic plastic material.

4. A construction as defined in claim 2, wherein each of said carriers is made of synthetic plastic material of a self-lubricating nature.

5. A construction as defined in claim 2, wherein each of said carriers has an individual driving spring tending to move its carrier from an initial tensioned position to a rest position independently of the driving springs of other carriers.

6. A construction as defined in claim 1, wherein each of said blades is rigidly connected to an individual carrier, and each carrier has two flanges substantially completely encircling one guide bar and spaced from each other in the direction of such bar and one additional flange with a laterally open slot only partially encircling the other guide bar in such position that the other guide bar holds the carrier against swinging in either direction around the guide bar which is encircled by the carrier.

7. A construction as defined in claim 1, further including a releasable latch for holding one blade of said closing group in an initial tensioned position, an exposure time adjusting member adjustable in the direction of movement of said blades, an actuating projection operatively connected to and movable bodily with one blade of said opening group, said time adjusting member having a displaceable part normally lying in the path of travel of said actuating projection and adapted to be displaced by said projection during opening movement of the blade to which said actuating projection is operatively connected, and means operated by displacement of said displaceable part of said time adjusting member for releasing said latch so that the blade latched thereby may move away from its initial tensioned position.

8. A photographic shutter of the focal plane type comprising means forming an exposure aperture, a plurality of shutter blades constituting an opening group of blades movable relative to said aperture to admit light therethrough during a photographic exposure, another plurality of shutter blades constituting a closing group of blades movable relative to said aperture to stop passage of light therethrough to terminate an exposure, at least one guide bar for guiding said blades, and an individual driving spring associated with each of said blades to drive each blade through its exposure movement independently of the driving springs of other blades, each blade and its individual driving spring lying on the same side of the guide bar of that blade, so that each driving spring acts on its associated blade at a point closer to the center of gravity of that blade than the guide bar on which that blade is mounted.

9. A construction as defined in claim 8, wherein one slide of each group is a main slide and another slide of each group is a trailing slide, characterized by the fact that the driving springs of the main slides are more powerful than the driving springs of the trailing slides.

10. A construction as defined in claim 8, characterized by the fact that at least one of said driving springs is anchored to an adjustable member adjustable in a direction effective to adjust the power exerted by the spring on its associated blade.

11. A construction as defined in claim 8, further including a toothed rack operatively connected in fixed relation to one of said blades of said opening group and extending in the direction of movement of such blade, said rack being engaged by a gear for moving such blade from a rest position to an initial tensioned position.

12. A construction as defined in claim 8, characterized by the fact that each individual driving spring is operatively connected to its blade at a point located between the center of that blade and the guide rod of that blade.

References Cited

UNITED STATES PATENTS

| | | | |
|---|---|---|---|
| 2,267,794 | 12/1941 | Kosken | 95—55 |
| 2,835,539 | 5/1958 | Conrad | 308—3 |
| 2,950,665 | 8/1960 | Meixner | 95—55 |
| 2,959,112 | 11/1960 | Dalton | 95—38 XR |
| 3,109,357 | 11/1963 | D'Oplinter | 95—55 |
| 3,143,758 | 8/1964 | Dunham | 308—6 |
| 3,163,195 | 12/1964 | Crosswell | 267—177 |

NORTON ANSHER, Primary Examiner

LEO H. McCORMICK, JR., Assistant Examiner

U.S. Cl. X.R.

95—38; 267—177